(12) United States Patent
Shackleton et al.

(10) Patent No.: US 9,420,213 B2
(45) Date of Patent: Aug. 16, 2016

(54) VIDEO CREATION MARKETPLACE

(75) Inventors: Lane Shackleton, San Francisco, CA (US); Fabio Soldo, Mountain View, CA (US); Andrew First, San Francisco, CA (US); Anand Rangarajan, Santa Clara, CA (US); JessicaKate Ogungbadero, San Francisco, CA (US)

(73) Assignee: Google Inc., Mountain View, CA (US)

( * ) Notice: Subject to any disclaimer, the term of this patent is extended or adjusted under 35 U.S.C. 154(b) by 93 days.

(21) Appl. No.: 13/533,786

(22) Filed: Jun. 26, 2012

(65) Prior Publication Data
US 2013/0343726 A1 Dec. 26, 2013

(51) Int. Cl.
| | |
|---|---|
| H04N 5/445 | (2011.01) |
| H04N 21/45 | (2011.01) |
| H04N 21/47 | (2011.01) |
| H04N 21/81 | (2011.01) |
| G11B 27/031 | (2006.01) |
| G06Q 10/10 | (2012.01) |
| G06Q 30/02 | (2012.01) |
| H04N 21/472 | (2011.01) |
| H04N 21/4788 | (2011.01) |

(Continued)

(52) U.S. Cl.
CPC ......... *H04N 5/44543* (2013.01); *G06Q 10/101* (2013.01); *G06Q 30/0241* (2013.01); *G11B 27/034* (2013.01); *H04N 21/4532* (2013.01); *H04N 21/4788* (2013.01); *H04N 21/47202* (2013.01); *H04N 21/812* (2013.01); *H04N 21/854* (2013.01)

(58) Field of Classification Search
CPC ............. G06Q 10/101; G06Q 30/0241; G11B 27/034; H04N 21/4532; H04N 21/47202; H04N 21/4788; H04N 21/812; H04N 21/854; H04N 5/44543

USPC .................................................. 386/278–290
See application file for complete search history.

(56) References Cited

U.S. PATENT DOCUMENTS 7,856,378 B2 * 12/2010 Mashinsky et al. .......... 705/14.4
2002/0026398 A1 * 2/2002 Sheth .............................. 705/37

(Continued)

FOREIGN PATENT DOCUMENTS

| JP | 2008217423 | 9/2008 |
|---|---|---|
| KR | 1020100001109 | 1/2010 |

(Continued)

OTHER PUBLICATIONS

Poptent, http://www.poptent.net/, Last accessed Mar. 22, 2012.

(Continued)

*Primary Examiner* — Gelek W Topgyal
(74) *Attorney, Agent, or Firm* — Fenwick & West LLP

(57) ABSTRACT

Systems and methods for facilitating collaboration between video creators/publishers and users in need of video creations and/or publication of videos are provided. A profile component receives and stores profile information regarding video creators. A video request component receives a request for at least creation of a video, the request indicating one or more characteristics associated with the creation of the video. A search component responds to the request and searches the profile information in connection with identifying one or more of the video creators that can create the video based on a correlation between their respective profile information and the one or more characteristics associated with the video creation.

30 Claims, 13 Drawing Sheets

(51) Int. Cl.
*H04N 21/854* (2011.01)
*G11B 27/034* (2006.01)

(56) References Cited

U.S. PATENT DOCUMENTS

| | | | |
|---|---|---|---|
| 2002/0026452 A1 | 2/2002 | Baumgarten et al. | |
| 2007/0038567 A1 | 2/2007 | Allaire et al. | |
| 2007/0078750 A1* | 4/2007 | Rosenbaum | 705/37 |
| 2008/0071594 A1 | 3/2008 | Morin | |
| 2008/0270358 A1 | 10/2008 | Chatow et al. | |
| 2008/0304806 A1 | 12/2008 | Lin | |
| 2009/0097815 A1* | 4/2009 | Lahr et al. | 386/52 |
| 2011/0008017 A1* | 1/2011 | Gausereide | 386/280 |
| 2011/0206351 A1* | 8/2011 | Givoly | 386/283 |
| 2013/0318156 A1* | 11/2013 | Friedman | H01L 29/06047 709/203 |

FOREIGN PATENT DOCUMENTS

| | | |
|---|---|---|
| WO | 9917242 | 4/1999 |
| WO | WO 2008/021373 A2 | 2/2008 |

OTHER PUBLICATIONS

International Search Report and Written Opinion for PCT Application Serial No. PCT/US13/41909, dated Aug. 22, 2013, 10 pages.
Extended European Search Report for European Patent Application No. EP 13810611.7, Feb. 8, 2016, 8 Pages.

* cited by examiner

VIDEO CREATION MARKETPLACE

TECHNICAL FIELD

This disclosure relates to facilitating collaboration between video creators/publishers and users in need of video creations and/or publication of videos.

BACKGROUND

Often times, users may receive a media advertisement, such as a video advertisement streamed to a client device in association with viewing an online media content. Advertisers are increasingly interested in advertising with video advertisements. However, one barrier to entry is the creation of a video asset to advertise. Finding a qualified video creator for the creation of the video asset can require considerable searching and effort. For example advertisers must often hire talent agencies to screen for video producers and negotiate production contracts.

SUMMARY

The following presents a simplified summary of the disclosure in order to provide a basic understanding of some aspects of the disclosure. This summary is not an extensive overview of the disclosure. It is intended to neither identify key or critical elements of the disclosure nor delineate any scope particular embodiments of the disclosure, or any scope of the claims. Its sole purpose is to present some concepts of the disclosure in a simplified form as a prelude to the more detailed description that is presented later.

In accordance with one or more embodiments and corresponding disclosure, various non-limiting aspects are described in connection with facilitating collaboration between video creators/publishers and users in need of video creations and/or publication of videos.

In accordance with a non-limiting embodiment, in an aspect, a system is provided comprising a profile component that receives profile information regarding video creators. For example, the profile information can include at least one of a services provided, characteristics of videos they are capable of creating, price for creation of a video, price for publication of a video, or time-frame for creation of a video. The system further includes a video request component that receives a request for at least creation of a video, the request indicating one or more characteristics associated with the creation of the video. The system also includes a search component that, in response to the request, searches the profile information in connection with identifying one or more of the video creators that can create the video based on a correlation between their respective profile information and the one or more characteristics associated with the video creation.

In accordance with a non-limiting embodiment, in an aspect, a system is provided comprising a profile component that receives profile information for a user, the profile information defining at least characteristics associated with video creation capabilities of the user. A data store can store the profile information. The system also includes a video request component that receives requests for creation of videos, the requests indicating one or more characteristics associated with the creation of the videos, and a posting component that posts the requests for the creation of the videos to a forum.

In yet another non-limiting embodiment a method is provided comprising receiving profile information regarding video creators and receiving a request for at least creation of a video, the request indicating one or more characteristics associated with the creation of the video. Further, in response to the request, the method comprises searching the profile information and identifying one or more of the video creators that can create the video based on a correlation between their respective profile information and the one or more characteristics associated with the video creation.

DETAILED DESCRIPTION

Figure 1:
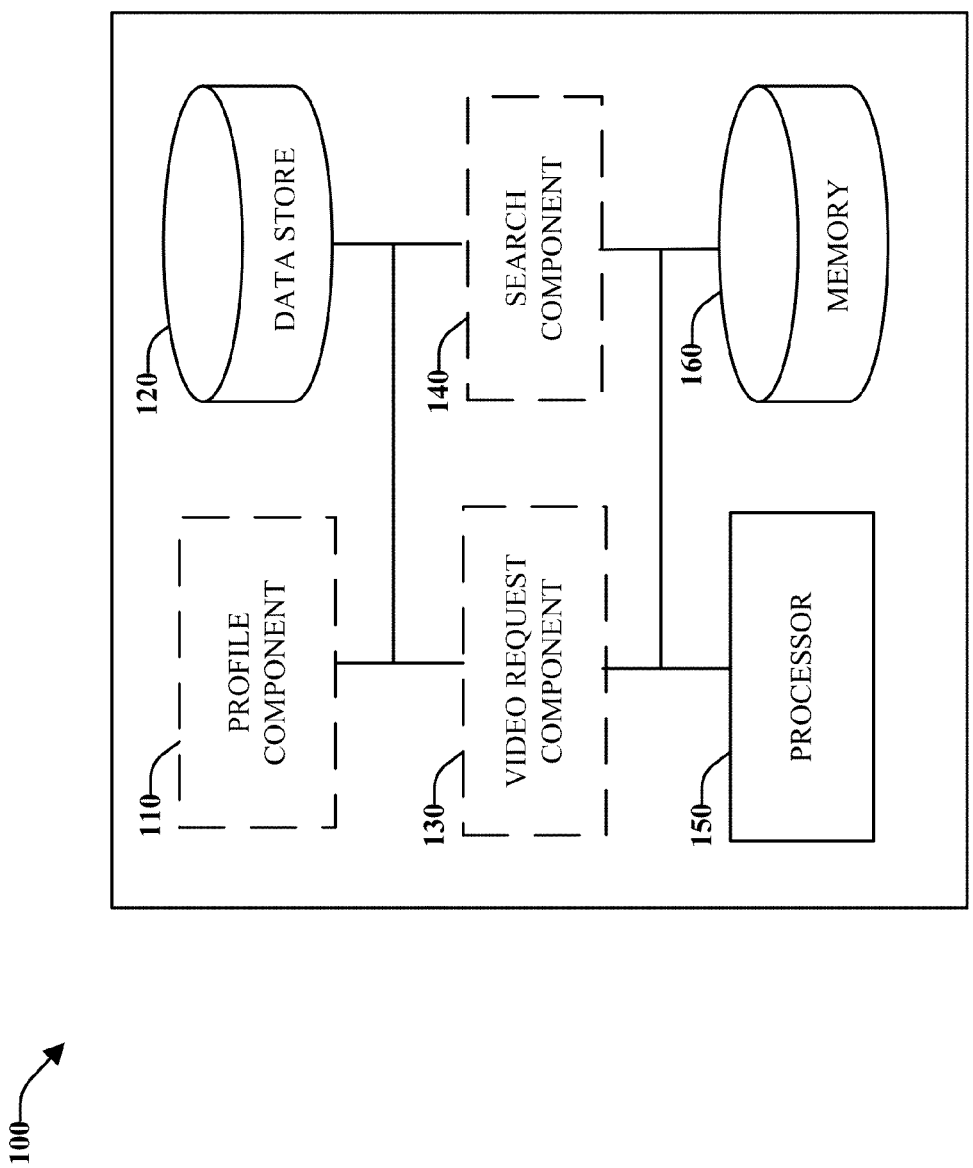
FIG. 1 illustrates an example non-limiting embodiment of a video creation marketplace system that facilitates collaboration between video creators/publishers and users in need of video creations and/or publication of videos in accordance with various aspects and implementations described herein.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

It is to be appreciated that in accordance with one or more embodiments or implementations described in this disclosure, users can opt-out of providing personal information, demographic information, location information, proprietary information, sensitive information, or the like in connection with data gathering aspects and publishing/providing profile information. Moreover, one or more embodiments or implementations described herein can provide for anonymizing collected, received, or transmitted data.

Referring now to the drawings, with reference initially to FIG. 1, a video creation marketplace system 100 is presented that facilitates collaboration between video creators/publishers and users in need of video creations or users in need of video creations and publication of the video creations. Aspects of the systems, apparatuses or processes explained in this disclosure can constitute machine-executable component embodied within machine(s), e.g., embodied in one or more computer readable mediums (or media) associated with one or more machines. Such component, when executed by the one or more machines, e.g., computer(s), computing device(s), virtual machine(s), etc. can cause the machine(s) to perform the operations described. System 100 can include memory 160 for storing computer executable components and instructions. A processor 150 can facilitate operation of the computer executable components and instructions by the system 100.

System 100 provides a tool for joining video creators specializing in various video creation and video publication services with users in need of the video creator's services based on correlations between the video creator's specialization and the user's needs. In an aspect, as used herein, the term "video creator" refers to a user that creates original video content. In an aspect, a video creator can be associated with a publication avenue, such a channel associated with a media streaming network. For example, a video creator may create original video content and regularly upload the video content to a channel assigned to the video creator at a media streaming system or website. In response to uploading, the original video content can be made available for viewing by others at the video streaming system or website. Video creators can further have express permission to use and monetize audio and video content they upload.

In another aspect, as used herein, the term "video creator" can also include a user who does not create new video content, but publishes video content, via uploading the video content to an assigned channel, that the video creator has express permission to use and monetize. For example, such a video creator can include a user who provides commentary on non-original video content, or who publishes non-original video content in a manner other than their original publication manner. As used in this disclosure, the terms "consumer" or "user" refer to a person, entity, system, or combination thereof that employs video creation marketplace 100 (or additional systems described in this disclosure). A user can include a video creator, a video creator who is also a publisher associated with a channel, or a video creation client (e.g. an entity requesting a video such as an advertiser).

Video creators can provide various services including the creation of new original videos and/or the publication of videos via their publication avenue. Video creators may specialize in video creation with respect to various parameters including but not limited to: video style, video content, video quality, video format, video length, video setting, video language, price for services, creator expertise, and etc. For example, a certain video creator may specialize in creation of skateboarding videos featuring women and having a high intensity style. Further video creators can provide publishing services for videos at their respective publication avenue (e.g. their assigned channel). In particular, a video creator may create a video and publish the video at his assigned channel or a video creator may publish a video created by another at his assigned channel. In an aspect, a video creator can be associated with or assigned to a channel such that the video creator has exclusive rights to publish video content on that channel. Further, it should be appreciated that a video creator can be restricted by the content (e.g., type, quality, . . . ) that the video creator is authorized to publish at the video creator's channel in accordance with a hosting servers publishing guidelines.

User's may desire to have a video published at a specific channel, such as the channel assigned to their video creator, because the specific channel may be a good avenue for publication of the video with respect to content and target audience of the video. For example, a video creator may specialize in publishing videos of a particular content or style, such as the video creator's original content. In another example, a video creator may publish non-original videos that are highly popular, or provide commentary on non-original videos that draw a wide audience. A video creator may further gain a following of viewers or an audience at the video creator's channel over time. A video creator's audience, including the number of viewers/subscribers in the audience and the demographic range of the video creator's audience, can be a direct reflection of the popularity of a video creator's channel and the video content thereof. In an aspect, a video creator can be associated with one or more types of audiences. For example, a type of audience can account for a specific demographic of viewers with respect to various parameters including but not limited to: age, gender, occupation, personal interests, or political affiliations. In furtherance of the example above, the video creator that specializes in creation of skateboarding videos featuring women and having a high intensity style may further publish his videos on an associated channel. Over time, the channel may gain popularity for example with an audience between the ages of 8 to 21 who are female and into skateboarding.

In an aspect, a channel of a video creator can include audience defined by viewers who subscribe to the video creator's channel. For example, a viewer may select the channel as a favorite or associated himself with the channel in a manner such that the viewers interest in the channel is recorded. In an aspect, a viewer can subscribe to a channel in exchange for payment. In another aspect, subscription to a channel can be free of charge.

In an aspect, users interact with video creation marketplace system via a client device (not shown). A client device can include any suitable computing device associated with a user and configured to interact with or receive media content. For example, a client device can include a desktop computer, a laptop computer, a smart-phone, a tablet personal computer (PC), or a PDA. In an aspect, a client device or video creation marketplace system 100 (or additional systems described in this disclosure) can be configured to access, transmit, and receive information via a network such as for example the Internet, intranet, or cellular service. According to this aspect, system 100 can be provided on one or more server computers and be presented to a user (via a client device) as an interactive webpage. A client device interfaces with video creation marketplace system 100 via the interactive web page using a browser. For example a page, such as a hypertext mark-up language (HTML) page, can be displayed at a client device and is programmed to provide the various functions of video creation marketplace systems described herein. It is noted that although the embodiments and examples will be illustrated with respect to an architecture employing HTML pages and the World Wide Web, the embodiments and examples may be practiced or otherwise implemented with any network architecture utilizing clients and servers, and with distributed architectures, such as but not limited to peer to peer systems.

Referring back to FIG. 1, in an embodiment, system 100 can include a profile component 110 that receives profile information regarding video creators. The profile information can further be stored in a data store 120. System 100 can further include a video request component 130 that receives a request for creation of a video and/or publication of the video on a channel. In an aspect, when the request includes a request for creation of a video, the request can indicate one or more characteristics associated with the creation of the video. In another aspect, when the request includes a request for publication of a video, the request can indicate that publication is desired on a channel and/or characteristics of the channel for which publication is desired. Search component 140 respond to requests and searches the profile information in connection with identifying one or more of the video creators that can create the video and/or publish the video based on a correlation between their respective profile information and the request criteria.

In an aspect, profile component 110 facilitates creation of user profiles which may then be stored in data store 120 and employed by search component 140. In an embodiment, video creators create profiles which are then stored in data store 120. A profile for a video creator can include information defining the characteristics and services of the video creator. For example, the profile of a video creator can indicate that the creator will create and/or publish videos, only publish videos the creator creates, only create videos, or only publish videos the creator did not create. In an aspect, the profile of a video creator can include information pertaining to characteristics of a video the video creator is capable of creating, including but not limited to: a type of content of the video, a style of the video, a number of actors in the video, a description of actors in the video, a setting of the video, a location of the video, a quality of the video, a formatting of the video, a resolution of the video, a program coding of the video, a language of the video, or a special effect of the video.

In another aspect, the profile of a video creator can include information pertaining to contractual requirements associated with the creation of a video and/or publication of a video, including but not limited to: price for creation, price for publication on the user' channel, timeframe for creation, schedule of publication, restrictions on publication of a video creation, restrictions on use of a video creation, licensing agreements/requirements, revenue sharing requirements, and etc. For example, a creator may be require that a video he creates only be published on channels A,B, and C of hosting service XYZ. A user profile for a creator can also include information indicating the number of subscribers in the creator's audience at the creator's channel, the demographic or type of the audience. Other information that can be included in a creator's profile can include ranking or rating information associated with at least quality of videos created and/or published by a video creator or ranking or rating information associated with popularity of the video creator and/or the video creator's channel.

In addition to listed criteria or characteristics, a profile of a creator can include descriptions that define information about the creator. For example, a profile for a creator may include a paragraph summarizing the expertise of the creator, the creator's qualifications, the creator's awards and accomplishments, the creator's mission and or theory of creation. In another example, a profile for a creator can include review commentary provided by various customers or clients who employed the creator's services. A user's profile, including lists of information, descriptions and reviews, can further be associated with metadata, (such as keyword tags), that facilitate matching of search terms to user profiles. It should be appreciated that the various information described above for inclusion in a profile for a creator is merely provided for exemplary purposes, and that any information that may characterize and promote the unique services of a video creator can be included in a profile.

Profile component 110 can be associated with an interface that facilitates receipt and editing of profile information. For example, in an aspect, the profile component 110 can employ an interface with a plurality of check boxes corresponding to characteristics or features. In order to create a profile a user may select the check boxes that are appropriate to the user. For example, if a user can create videos in the category of architecture, the user would select the box for that category. Further, the user can provide descriptions of his services to the profile component 110. According to this aspect, a user profile can be defined by the user. The user can further edit his profile at his or her discretion. For example, a user may desire to raise price for services as popularity of the video content and associated channel increase. In other aspect, profile component 110 can receive profile information for a user from other users and/or via an auto-population mechanism associated with machine learning of information, such as via an intelligence component. For example, a user may be rated by other users and/or a machine learned rating mechanism. Such rating information can further automatically be associated with a user's profile.

In yet another aspect, rating information associated with a creator's video content and/or a creator's channel may be imported by profile component 110 from external systems (not shown). For example, an external system may monitor user interest in video content and generate rating information associated with the popularity or quality of the video content based on the monitored user interest. Such user interest can be determined by external systems such as for example as a function of number of subscribers to a video creators channel, number of views of the video content on the creator's channel, user interaction with the video content, user engagement with the video content when viewed, and/or sharing of the video content.

In an embodiment, video request component 130 receives a request for creation of a video, creation and publication of a video, or publication of a video. For example, one application of system 100 (and additional systems described herein), is the ability for advertisers, or user's who desire to have a video advertisement created for a product or service and further have the advertisement distributed on a channel that reaches a targeted audience. The subject video creation marketplace systems provide a means to connect two parties for purposes of video creation and potential distribution to audiences. For example, a toy company that has a website but does not have a video to explain their new toy may want a video created about the new toy which they can play on their website and/or a channel associated with a video creator. The, toy company could navigate to the subject video creation marketplace and conduct a search for video creator's specializing in "toys." The search could further identify other requirement of the potential video creator, including price, services, or audience. Search component 140 can carry out the search against creator profiles in data store 120 to identify creator's that match the search criteria. A communication tool can further connect the parties such as via providing of contact information or initiating electronic messaging between the two parties.

In an embodiment, video request component 130 employs an appropriate interface that allows users to specify search criteria related to identifying a potential video creator that fits his or her needs. For example, a user may enter video creation marketplace via an interactive website and indicate that they are an advertiser. In turn, video request component 130 can display an interface that facilitates searching for potential video creators. In an aspect, the video request component 130 can provide a keyword searching tool that allows users to input one or more keywords with various term connectors. In another aspect, the video request component 130 can provide various dialog boxes that allow a user to select desired search criteria from a list or drop down menu. For example, the video request component 130 can provide a form with multiple categories including but not limited to: content category, audience size, price range, region, language, and completion timeframe. In order to generate a search, a user can enter in search criteria by selecting the desired information from the form.

Video request component 130 can receive requests for creation of a video, the request including one or more characteristics associated with creation of the video. In an example, the one or more characteristics include a price associated with creation of the video. In another example, the one or more characteristics include a desired characteristic of the video. In particular, a desired characteristic of the video can include but is not limited to: type of content of the video, style of the video, number of actors in the video, description of actors in the video, setting of the video, location of the video, quality of the video, formatting of the video, resolution of the video, program coding of the video, language of the video, or special effect(s) of the video. In another example, the one or more characteristics include a desired rating of a potential video creator, wherein the rating is associated with at least one of quality of videos produced by the potential video creator or popularity of the potential video creator with respect to an associated audience. Still in yet another example, the one or more characteristics include a time frame for the creation of the video, a location for creation of the video, or a length of the video.

In another aspect, the video request component 130 can receive a request for publishing of a video on a channel associated with a potential video creator of the video following creation of the video or for publishing of a video in general (e.g. not created by the publisher). In turn, the search component 140 can search the profile information of video creators in connection with identifying one or more of the video creators that can create the video and publish the video on their respective channel or merely publish a video created by another, based on their respective profile information. For example, the request can define characteristics of a video to be created, characteristics of the potential video creator (e.g. a rating), and define a request for publication at the creator's channel. In another example, the request may only include a request for publication of a video at a creator's channel. In an aspect, the request for publication can further include information related to a desired audience of the potential creator, including size and/or demographic of the audience. In yet another aspect, the request of publication can include publishing parameters and requirements (e.g. time of day, frequency, and etc). In view of the above noted features of system 100, an advertiser can find a video creator that can not only create a video advertisement that fits their content and quality needs, but a video creator that can publish the advertisement to a known target audience. In another aspect, an advertiser may have a video created by a creator who does not have a large audience but who charges a low price for video creation. The advertiser may then find a different creator to publish the video at his or her channel who has a large audience yet charges a high price for video creation.

Once the video request component 130 has received search information including one or more criteria for a creation and/or publication of a video, search component 140 performs a search to identify one or more creators that satisfy or substantially satisfy the one or more search criteria. In particular, search component 140 can search through creator profile information to identify creators whose profile information matches or substantially matches the search criteria. The search component 140 can further present a user with a query or search result with a list of potential creator's that fit or substantially satisfy the user's search criteria. In an aspect, the search component 140 can present the user with an interactive interface that displays parts or summaries of creator profiles to facilitate the user in selecting an appropriate creator. For example, the search component 140 can present a user with an example videos for a creator, a location of the creator, and a number of subscriber's to the creator's channel. A user can then select creators from the search query view their full profiles and to contact and potentially hire for creation and/or publication of a video. The search component 130 can apply various predefined algorithms that relate search criteria and related key terms to the information defined in user profiles.

Figure 2:
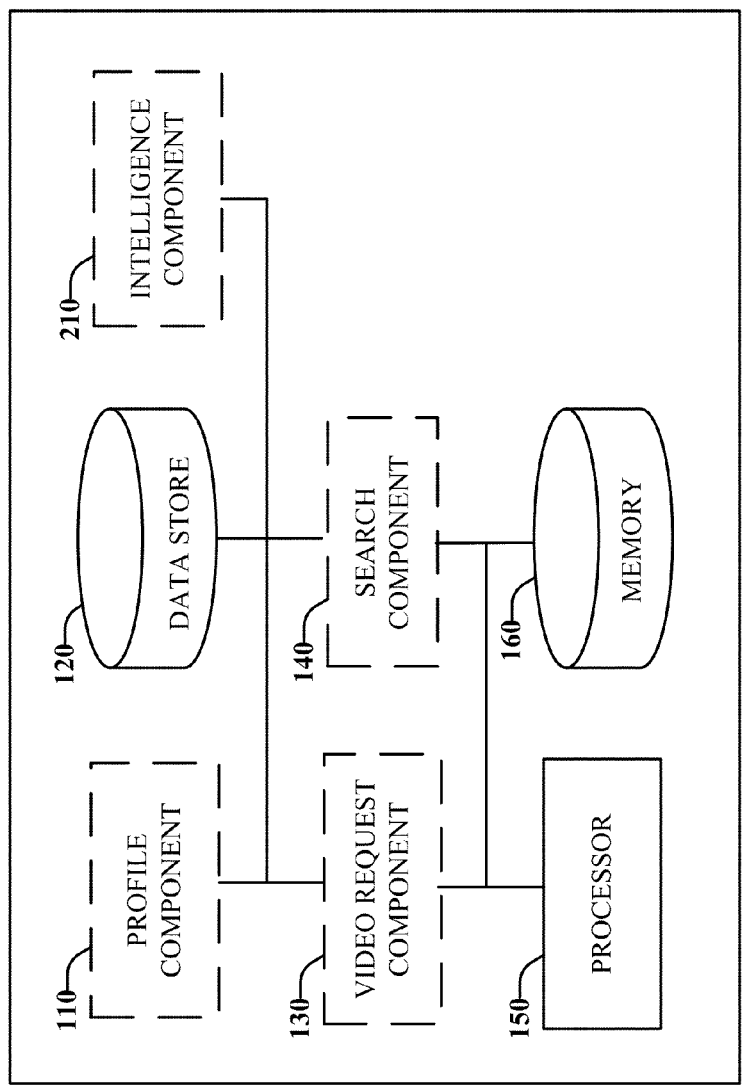
FIG. 2 illustrates an example of another non-limiting embodiment of a video creation marketplace system that facilitates collaboration between video creators/publishers and users in need of video creations and/or publication of videos in accordance with various aspects and implementations described herein.

Referring now to FIG. 2, presented is a video creation marketplace system 200 that facilitates collaboration between video creators/publishers and users in need of video creations and/or publication of videos. System 200 can include intelligence component 210. In an aspect, intelligence component 210 can facilitate generation of user profiles by making various inferences and determinations regarding a user's needs and qualifications. In another aspect, intelligence component 210 can facilitate generating ratings for creators by making inferences and determinations in view of external information and/or user provided ratings. Still in another aspect, intelligence component 210 can facilitate search component 140 in matching creators with users requesting video creations and/or publications of videos. For example, intelligence component 210 may employ learned associations between user selections of creators, search criteria, and creator profiles to infer or determine key term, metadata tags, and information to include in a creator profile to enhance matching of the creator profile with appropriate clients. In another example, intelligence component 210 may employ learned associations between user selections of creators, search criteria, and creator profiles to enhance matching of the creator profiles with appropriate clients.

In order to provide for or aid in the numerous inferences described in this disclosure, intelligence component 210 can examine the entirety or a subset of data to which it is granted access in order to provide for reasoning about user engagement with an advertisement. Intelligence component 210 can be granted access to any suitable information associated with system 200 (and additional system described herein), including profile information, search criteria, user selections in response to searches, business transaction information between creators and clients, as well as accessible extrinsic information such as information related to user interest in video content of a creator and/or a creator's channel. Intelligence component can further employ extrinsic information related to current events and extrinsic information related to social media networks.

Intelligence component 210 can perform inferences to identify a specific context or action, or to generate a probability distribution over states, for example. The inferences can be probabilistic—that is, the computation of a probability distribution over states of interest based on a consideration of data and events. An inference can also refer to techniques employed for composing higher-level events from a set of events or data. Such inference can result in construction of new events or actions from a set of observed events or stored event data, whether or not the events are correlated in close temporal proximity, and whether the events and data come from one or several event and data sources. Various classification (explicitly or implicitly trained) schemes or systems (e.g., support vector machines, neural networks, expert systems, Bayesian belief networks, fuzzy logic, data fusion engines, etc.) can be employed in connection with performing automatic or inferred action in connection with the claimed subject matter.

A classifier can map an input attribute vector, $x=(x1, x2, x3, x4, xn)$, to a confidence that the input belongs to a class, such as by $f(x)=confidence(class)$. Such classification can employ a probabilistic or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used in this disclosure also is inclusive of statistical regression that is utilized to develop models of priority.

In an embodiment, the intelligence component can generate information for a user profile by providing a user with multiple questions that relate to the user's needs and abilities. The intelligence component 210 can further infer information to provide to profile component 110 based on a user's answers to the questions. Further, the intelligence component can dynamically infer appropriate questions to ask a user based on answers to previously asked questions. As a result, the intelligence component can employ machine learning techniques to automatically build comprehensive profiles for users that include the necessary language and metadata for identification of the profiles by the search component in response to search criteria.

Figure 3:
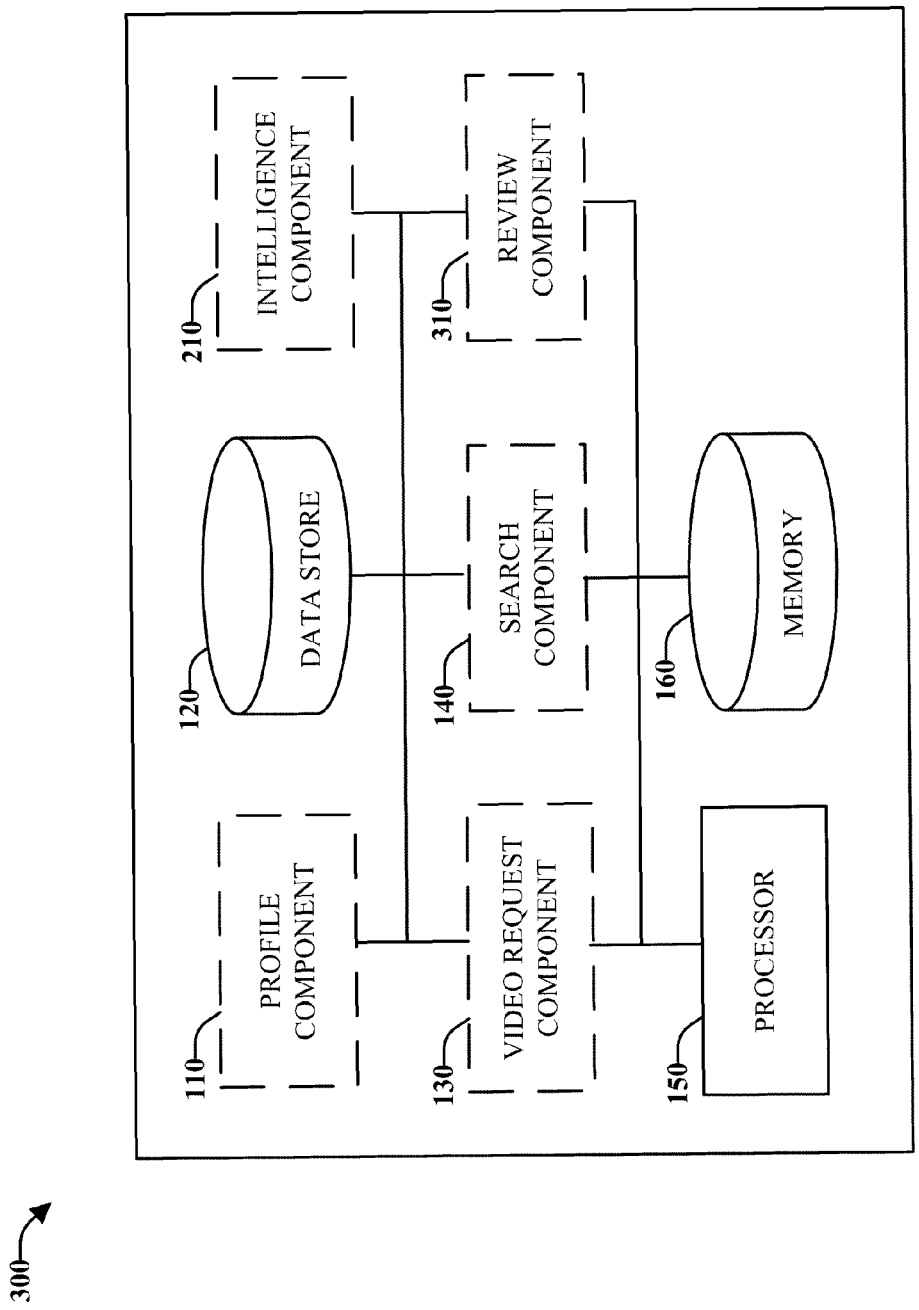
FIG. 3 illustrates an example of another non-limiting embodiment of a video creation marketplace system that facilitates collaboration between video creators/publishers and users in need of video creations and/or publication of videos in accordance with various aspects and implementations described herein.

With reference to FIG. 3, presented is another exemplary non-limiting embodiment of a video creation marketplace system 300 that facilitates collaboration between video creators/publishers and users in need of video creations and/or publication of videos. System 300 can include a review component 310 that receives a rating information for a video creator and associates the rating information with the video creator's profile. Such rating information can relate to various characteristics of a creator and/or the creator's channel. For example, the rating information can relate to a quality of the creator's videos, the quality of the creator's channel, the popularity of a creator's videos, the popularity of a creator's channel, or the popularity of a creator's channel with respect to a certain audience. Rating information can further relate to the level of professionalism of a creator, a level of reliability of the creator, a number of positive reviews, or a number of negative reviews. Further, rating information can provide a general rating score for a creator that can encompass a plurality of the above factors. The review component can also employ a mechanism to ensure rating information is up to date and is not representative of past statistics. For example, the review component 310 may update ratings and reviews of a creator on a daily basis, a weekly basis, a monthly basis, and etc.

Review component 310 can employ a variety of techniques to receive rating information for a creator. In one aspect, the review component 310 can allow users of system 300 to rate and review each other. For example, review component 210 can allow clients of a creator to review and rate the creator after employing the creator's services. In another aspect, the review component 310 can allow a user to rate another user. For example, a user, including a potential client of a creator or another creator, could rate quality of the creator's videos. The review component 310 can employ any suitable mechanism for users to rate one another, such as a survey with options to rate creators in multiple categories or a simple option to give a user a thumbs up or thumbs down. In turn, the review component 310 can employ various algorithms configured to calculate rating scores for a user based on survey results and associate the rating scores to a user's profile. In addition, the review component 310 can allow users to write reviews of other users that can be posted to the other user's profiles.

In an embodiment, the review component 310 can further employ monitored information regarding a user's activity with respect to the video creation marketplace and/or extrinsic information to automatically determine or infer a rating of a user and associate that rating with the user's profile. In an aspect, the review component 310 can monitor activity internal to the video creation marketplace, including but not limited to the number of clients that a creator receives, the number of repeat clients, or the efficiency of production of the creator. Any information monitored or gathered by the review component 310 can further be stored (either permanently or temporarily) in memory, such as memory 160.

The review component 310 can further receive external information including but not limited to: number of views of a creators videos, number of subscribers to a creator's channel, or externally provided reviews and comments of a creator's channel or video content. In an aspect, review component 310 can gather information about a creator from social networking systems. For example, review component 310 may gather information regarding the posting of links to a creator's video content at one or more social networking websites, or followers of a creator at one or more social networking websites. In another aspect, the review component 310 can gather information regarding user interest or engagement levels in a creator's videos and/or channel from one or more external systems. For example, an external system may monitor various real-time factors associated with viewing video content including but not limited to: interaction with a video as it is played/streamed (e.g. pausing, rewinding, fast-forwarding, and etc.), interaction with a user device at which a video is played (e.g. mouse movement, user posture, user's direction of vision), video player volume, video player size, or video player location with respect to the user interface and other windows open in the user interface. Such information monitored by external systems may be employed by the external systems to determine user interest in a video content of a creator. The review component 310 can further employ user interest determinations to determine or infer a rating of a creator and associate the rating with the creator's profile.

The review component 310 can further utilize intelligence component 210 to aid in various inferences and determinations regarding ratings of user. In particular, the review component 310 can employ user provided ratings, internal statistics, and external information, to determine or infer rating information of a user. In turn the review component 310 can associate the rating information with the user's profile. For example, the review 310 component may determine or infer a general rating score for a creator based on all gathered/received information and/or determine or infer ratings of a creator for various categories (e.g. quality or popularity).

Figure 4:
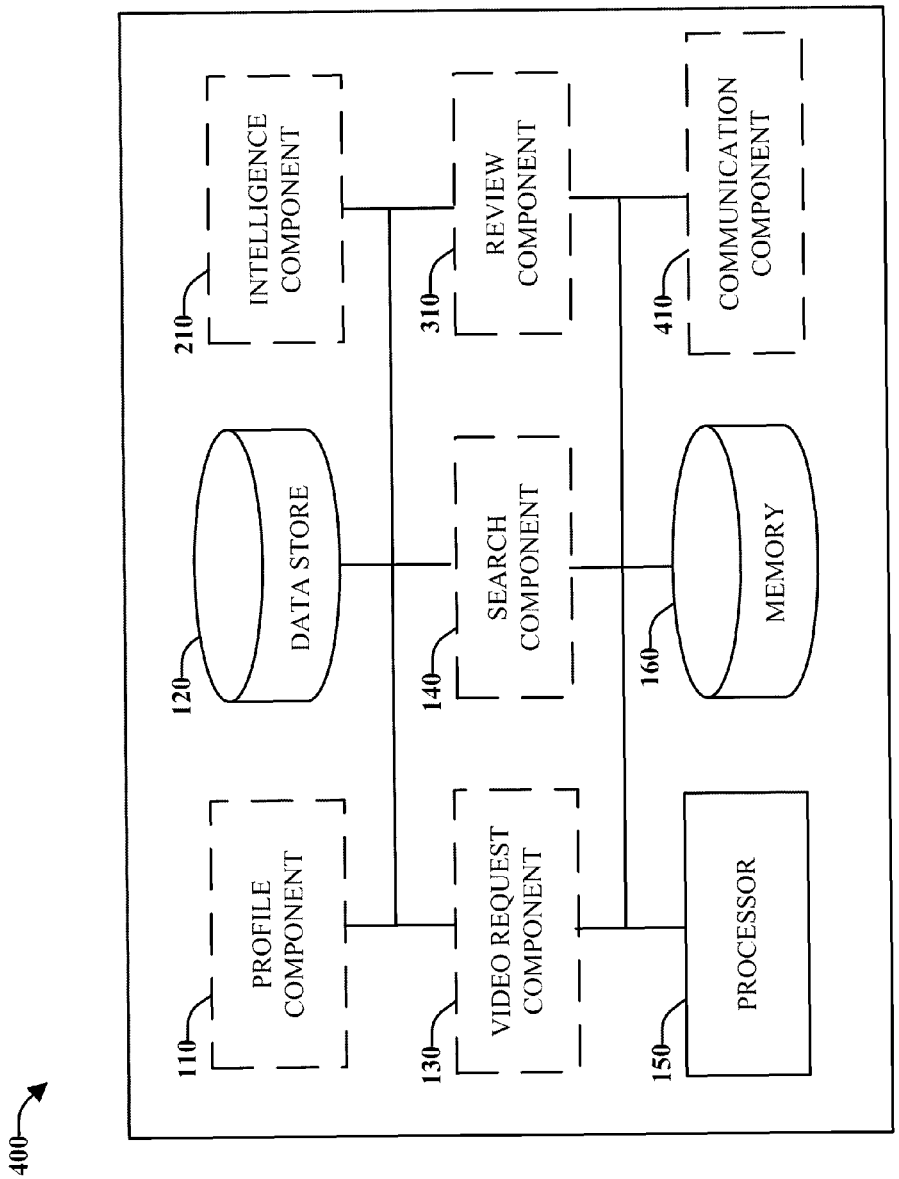
FIG. 4 illustrates an example of another non-limiting embodiment of a video creation marketplace system that facilitates collaboration between video creators/publishers and users in need of video creations and/or publication of videos in accordance with various aspects and implementations described herein.

Turning now to FIG. 4, presented is another exemplary non-limiting embodiment of a video creation marketplace system 400 that facilitates collaboration between video creators/publishers and users in need of video creations and/or publication of videos. System 400 can include a communication component 410. Communication component 410 facilitates communication between users of video creation marketplace. In an aspect, communication component 410 facilitates communication between a user making a request for a video creation and/or publication and a video creator that satisfies or substantially satisfies the criteria of a request. In particular, search component 140 can present a user with one or more creators that satisfy search criteria provided by the user. In turn, the user may select one or more of the creators to contact and potentially negotiate an agreement for creation of a video and/or publication of a video. In an aspect, communication component 410 provides a platform for enabling the user to contact a creator in a secure environment internal to a video creation marketplace. For example, communication component 410 can enable electronic messaging between users without providing personal contact information of either user to one another. In another aspect, the communication component can merely provide contact information of users to one another.

Figure 5:
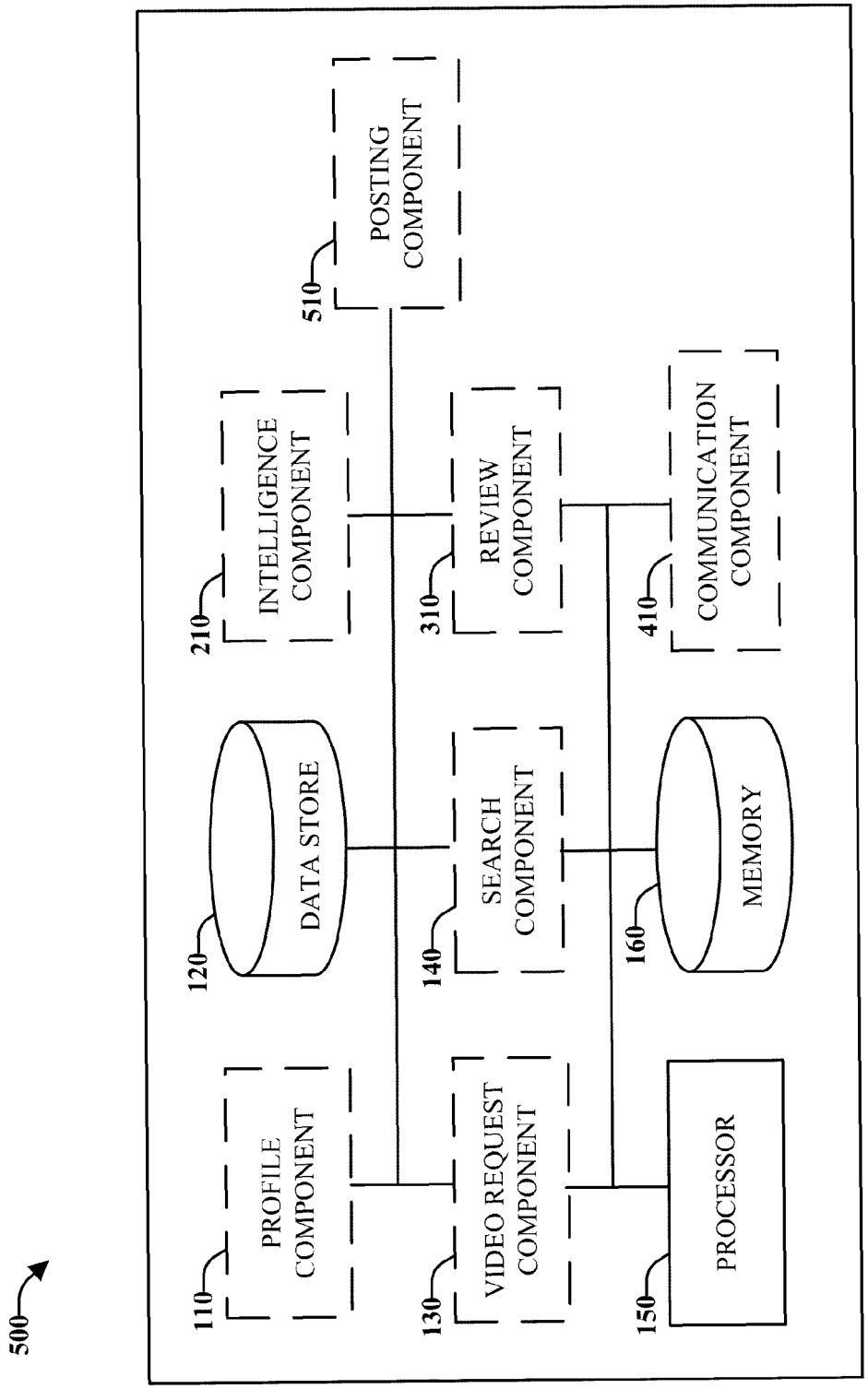
FIG. 5 illustrates an example of a non-limiting embodiment of a video creation marketplace system that facilitates collaboration between video creators/publishers and users in need of video creations and/or publication of videos in accordance with various aspects and implementations described herein.

With reference to FIG. 5, presented is another exemplary non-limiting embodiment of a video creation marketplace system 500 that facilitates collaboration between video creators/publishers and users in need of video creation and/or publication of videos. System 500 particularly presents a system where users in need of video creation/publication can find creators, and where creators can find users in need of video creation and/or publication. System 500 can include a posting component 510 that posts a request for a video creation and/or publication to forum or a profile associated with the video requester. In turn, search component 140 can perform queries against the forum or requester profiles to identify requests for video creations and/or publications that a creator may desire to fulfill.

In an aspect, profile component 110 can generate a profile for a user who requests a video creation and/or publication in a same or similar manner to profiles generated for creators. A user who makes a request for a video creation and/or publication is referred to as a "requester." Profile component 110 can further store the requester profiles in data store. In an aspect, a requester profile can identify a requester and provide at least basic contact and location information for the requester. According to this aspect, a requester can create a profile having at least information identifying the requester. Then, each time the requester makes a request via request component 130, the request can be posted by posting component 510 to the requester's profile. The request can remain posted to the requesters profile until it is fulfilled or removed by the requester. In another aspect, a user requester can provide information to his or her profile that can be used to tailor offers by appropriate creators. For example, a profile of a requester can include parameters that may apply to any request made by the requester. Such parameters may relate to a quality of a creator, a rating of the creator, a location of a creator, an age of a creator, or an area of expertise of the creator.

In another aspect, a requester profile can include in depth information regarding the needs of the requester. For example, a requester may provide profile component 110 with information identifying himself and his needs with respect to video creation and/or publication. An example requester profile can include same or similar information as that of a creator. For example, a requester profile may indicate a type of video desired, content of the video desired, location of the video desired, language of the video desired, quality of the video desired, or time-frame of completion of the video desired. The profile may also include information related to a price willing to be paid for video creation and/or a minimum rating associated with a desired video creator. The profile may also include information related to publication, such as an audience type, a number of subscribers in the audience, or a frequency of publication on a creator's channel. The profile component may also apply a series of questions to ask the requester on order to generate an in-depth profile for the requester via intelligence component 210.

In an embodiment, in the alternative or in addition to generating requester profiles, posting component 510 can post a user's request for a video creation and/or publication to a forum. The request can outline or define any information related to a request for video creation and/or publication as received at request component 130, including characteristics of a desired video, characteristics of a desired creator, characteristics of a desired creator's publication channel, terms of a potential service agreements and etc. For example, a posted video creation request may include a request for a video creation request having at least one of the following characteristics: a desired price for the creation of the video, a desired association for the publishing of the video, a desired time-frame for the creation of the video, a desired location for the publishing of the video, or a desired characteristic of the video.

Therefore the video request component 130 is further configured to receives a request for a video creation request having one or more characteristics associated with creation of the video. In turn, the a search component 140 can be further configured to perform queries against requester profiles stored in data store 120 and/or a forum to which requests are posted based on the request for the video creation request and identify one or more video creation requests that have the one or more characteristics associated with creation of the video. In response to identification of fitting video creation requests, the communication component 410 can be employed to initiate communication with the user initiating the search (the creator) and the user providing the video creation request (the requester). For example, a creator may employ system 500 to help a creator determine if any potential clients want to purchase a skateboard video for channel X.

In particular, creators may employ system 500 to find video creation and/or publication jobs that they may be able to perform. A video creator can first identify himself to the video creation marketplace system as a creator. In turn, the video request component 130 and search component 140 can tailor the system to service requests from creators. For example, the video request component 130 can provide an interface that allows the creator to enter search criteria related to finding video creation request. A drop down menu can be provided that allows the creator to specify criteria of a request he can fulfill. For example, the drop down menu may allow the creator to select search criteria indicating that he is able to create videos related to kids' toys, in high definition, within a time frame of two weeks, for under $5,000.

In another embodiment, the search component 140 can perform automatic searching and matching of creators with requestors based on their respective profiles or posted requests. For example, a creator can create a profile defining his qualifications and services as described above. In response to creation of his profile, the search component 140 can identify requesters and their respective requests that satisfy characteristics included within the profile information of the creator. Similarly, in response to creation of a requester profile or in response to posting of a request for creation and/or publication of a video, the search component 140 can identify creators that satisfy characteristics included within the profile information of the requester or that satisfy the posted request of the requester. This aspect of automatic searching and matching can be performed by search component on a scheduled basis so that system 500 continuously identifies new matches between creators and video creation requests.

Figure 6:
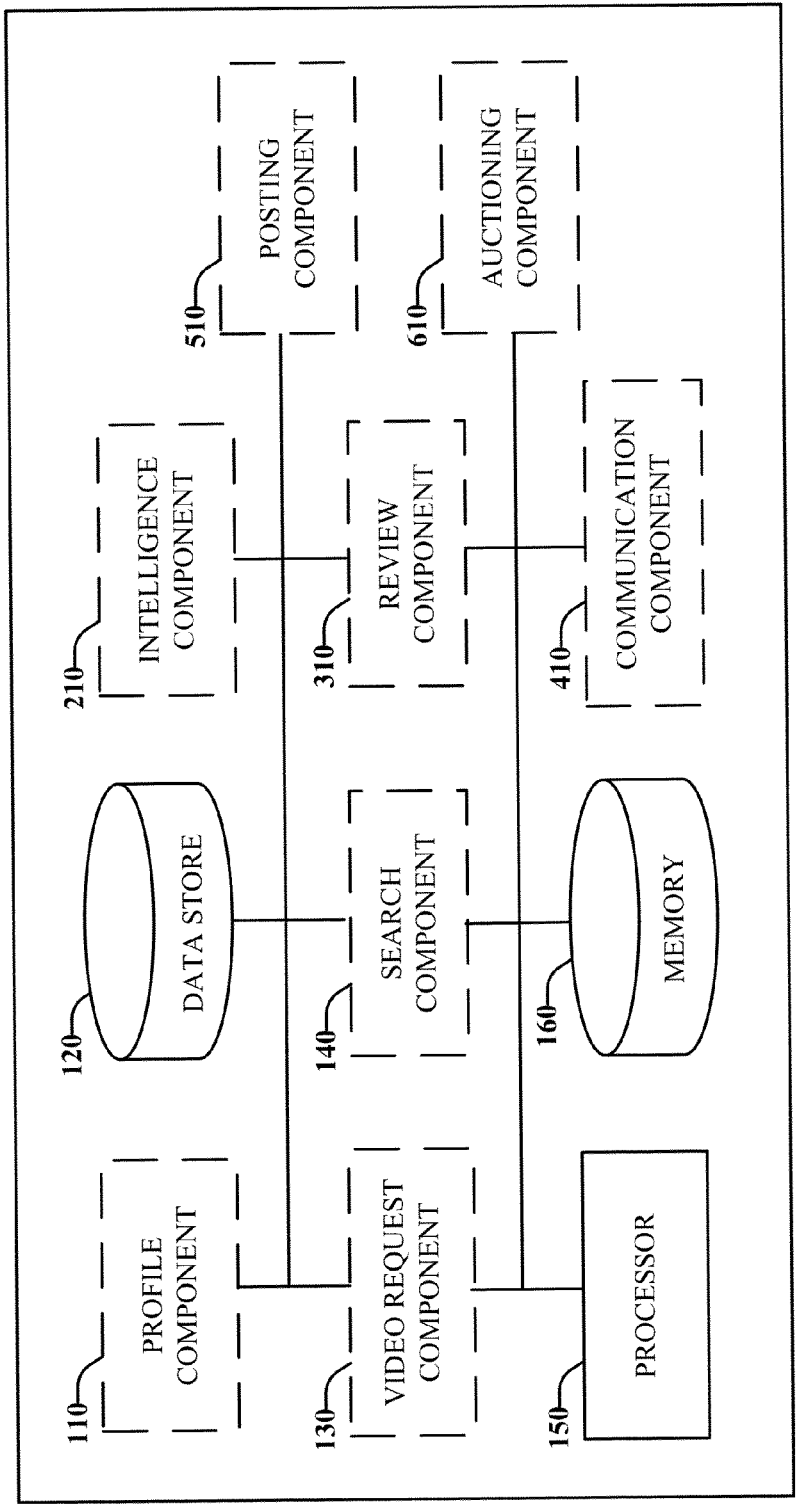
FIG. 6 illustrates an example of a non-limiting embodiment of a video creation marketplace system that facilitates collaboration between video creators/publishers and users in need of video creations and/or publication of videos in accordance with various aspects and implementations described herein.

With reference to FIG. 6, presented is another exemplary non-limiting embodiment of a video creation marketplace system 600 that facilitates collaboration between video creators/publishers and users in need of video creation and/or publication of videos. System 600 can include auctioning component 610 that receives a bid from a video creator to service a video creation/publication request presents the bid to the video requester. In an aspect, auctioning component 610 can set up an auctioning interface or bidding interface that allows creators to place bids for requested video creation and/or publication jobs. In an aspect, in association with posting of video creation requests to a forum, the auctioning component 610 can set up the auctioning interface. For example, the posting can include information defining the request in a searchable form and also comprise a link to an interface to provide a bid to service the request. In another aspect, the auctioning component can link requester profiles to an auctioning interface that accepts bids to services requests of the requester profile. A creator can thus search for video creation/publication requests, or be automatically presented with video creation/publication requests that fit his profile. In turn, the creator can review a request for a video creation and/or publication and place a bid to the auctioning component 610 for the project. In an aspect, the auctioning component 610 can be configured to receive a plurality of bids over a predetermined amount of time and present the bids to the requester. In another aspect, the auctioning component 610 can be configured to provide only a highest bid in a predetermined amount of time, to the requester. Later, the requester can decide whether to accept a bid or not.

Figure 7:
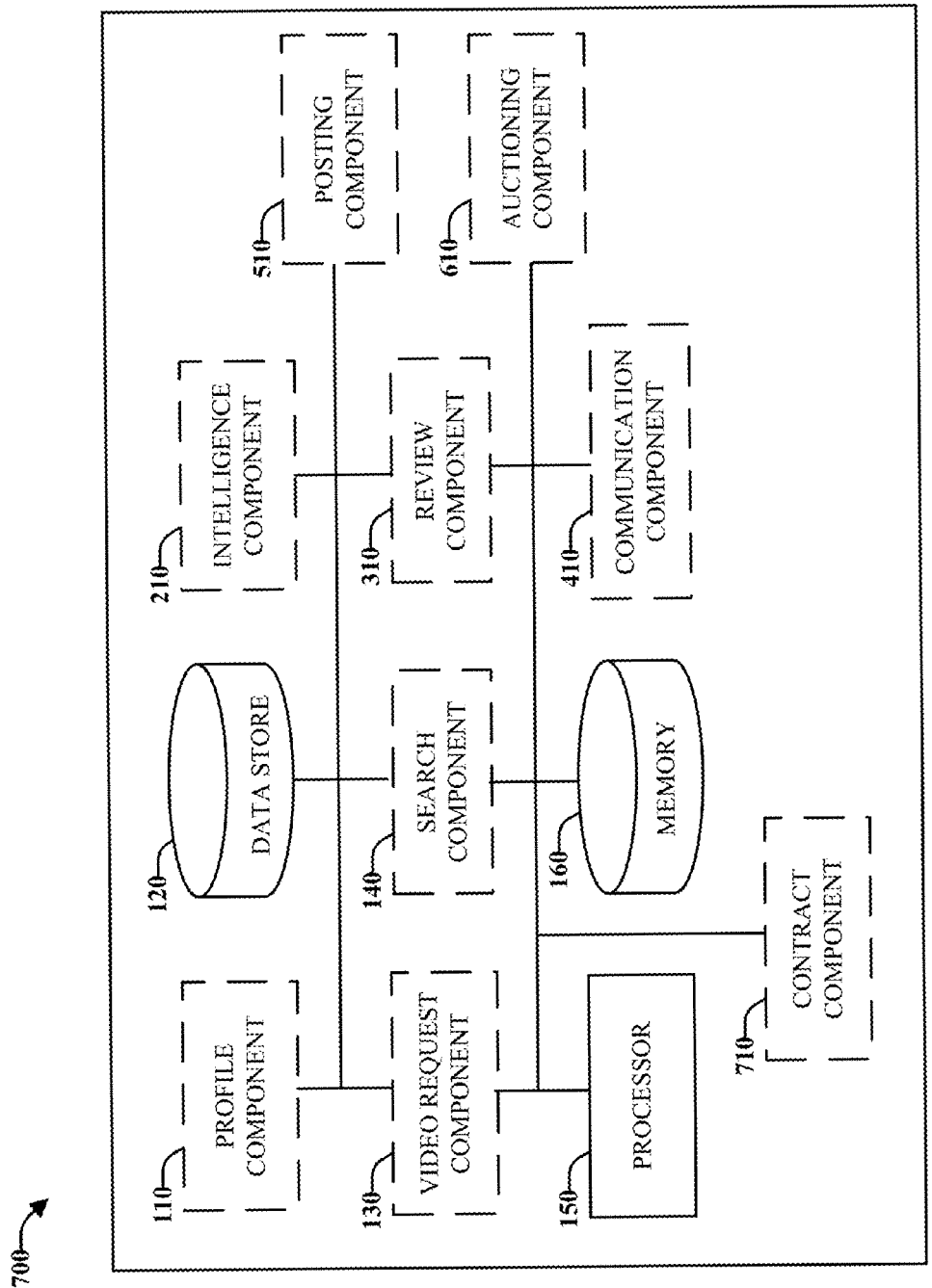
FIG. 7 illustrates an example of a non-limiting embodiment of a video creation marketplace system that facilitates collaboration between video creators/publishers and users in need of video creations and/or publication of videos in accordance with various aspects and implementations described herein.

With reference to FIG. 7, presented is another exemplary non-limiting embodiment of a video creation marketplace system 700 that facilitates collaboration between video creators/publishers and users in need of video creation and/or publication of videos. System 700 can include contract component 710. Contract component 710 can facilitate granting of bids for a video creation/publication request and generating a contract between the bidder and the user making the request. The contract can define terms for at least one of the creation of a video and/or the publishing of a video. In an aspect, the contract component 710 can be authorized by a requester to grant a bid to the highest bidder. In another aspect, the contract component 710 can be required to receive authorization from a requester to grant a bid following review of the bid by the requester.

In an aspect, in response to granting a bid, the contract component 710 can generate a contract that includes the terms of the video creation/publication request and any requirements defined by the video creator in the video creator's profile. In another aspect, the contract component 710 can apply a standard contract provided by system 700 and stored in memory 160, having legal terms and conditions for the creations and/or publication of a video. The standard contract can further by supplemented by the contract component 710 with information based on the requester's request and the bidder.

In another aspect, the contract component 710 can generate a draft contract that includes the terms of the video creation request, and terms defined by the bidder in association with the bidder's profile. The contract component 710 can further present the contract to both parties. In turn, both parties can edit the contract as they deem appropriate. Upon completion of editing, both parties can authorize a final draft of the contract and return a signed or otherwise authorized copy of the contract to the contract component 710. Upon receipt of the authorized final copy of the contract, the contract component 710 can grant the bid and store the contract in memory 160.

Figure 8:
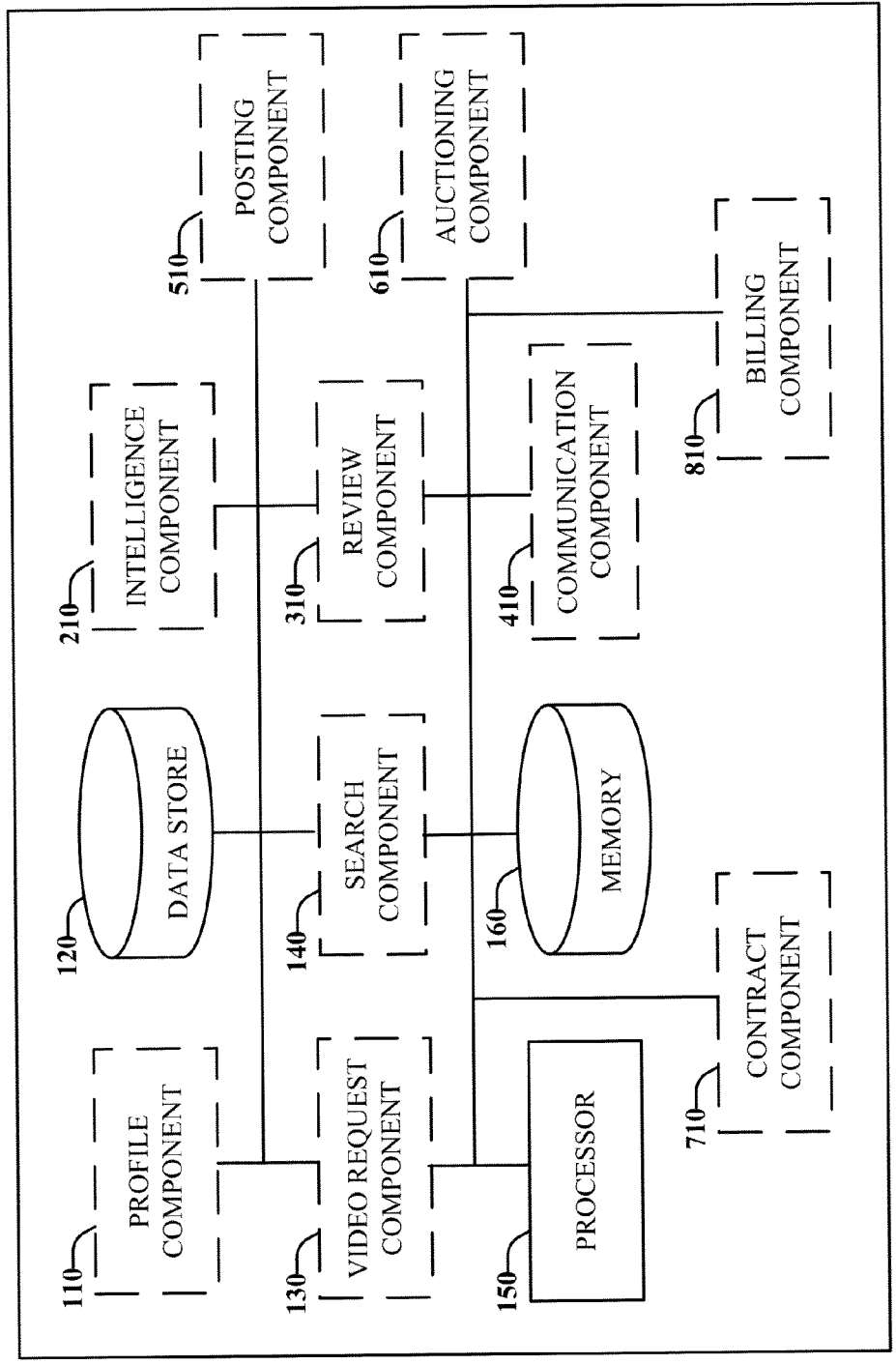
FIG. 8 illustrates an example of a non-limiting embodiment of a video creation marketplace system that facilitates collaboration between video creators/publishers and users in need of video creations and/or publication of videos in accordance with various aspects and implementations described herein.

With reference to FIG. 8, presented is another exemplary non-limiting embodiment of a video creation marketplace system 800 that facilitates collaboration between video creators/publishers and users in need of video creation and/or publication of videos. System 800 can include billing component 810 that can provide for auditing and distributing revenue to respective parties associated with a video creation and/or video publication. In one aspect, billing component 810 can facilitate billing a video requester in accordance with a contract generated by contract component 810. In another aspect, the billing component 810 may further monitor usage of a video and distribute revenue generated from usage of the video to respective parties as defined in a contract.

The billing component 810 can generate a bill in response to the occurrence of a billable event and provide the bill to appropriate entity. In an aspect, the billing component 810 can generate an electronic bill and deliver the electronic bill as an electronic message. In another aspect, the billing component 810 may link to user monetary accounts for authorized, automatic electronic payment and distribution of revenue.

In an embodiment, billing component 810 may generate a bill for the creation and/or publication of a video in the manner defined by a contract. For example, the contract may require full payment prior to creation, partial payment prior to creation and full payment following completion of the video, or full payment only at completion of the video. In another example, a contract may provide for a flat fee to be paid for publishing of a video on a creator's channel, a monthly fee for publishing, a fee each time the video is played, or a fee each time the video is played longer than 15 seconds, and etc.

In an aspect, a video can be associated with multiple billing events over time. For example, with respect to publishing, a video may be associated with a billable event each time it is played at a creator's channel. According to this aspect, the billing component 810 is configured to monitor billing events and generate bills for respective parties and/or distribute money to respective parties in response to a billing event. In addition, in an aspect, a video may generate revenue. For example, other entities may pay for usage of the video. The billing component 810 can be further configured to distribute revenue generated from usage of a video to appropriate parties as defined in a contract. In an aspect, both the creator of the video owner (e.g. the requester), may receive revenue generated from a video. For example, a contract may further include a provision that provides dividends from proceeds of the video to the creator and the owner. The billing component 810 can further track money owed to respective parties and provide the respective parties indication of the money owed thereto. The billing component 810 can further track money owed to respective parties and automatically distribute revenue to the respective parties having authorized accounts linked to system 800.

Figure 9:
FIG. 9 presents an exemplary screenshot 900 of a user interface for employing a video creation marketplace system in accordance with various aspects and implementations described herein.

FIG. 9 presents an exemplary screenshot 900 of a user interface for employing a video creation marketplace system (e.g. systems 100-800 described herein), in accordance with an embodiment. Area 910 presents an interactive input menu that provides multiple input boxes for a user to select search criteria of a video that they desire to have created and published by a video creator associated with video creation marketplace. For example, as seen in FIG. 9, area 910 includes an input box for a user to select a content category for what the content of the video is to be about, an input box to select a desired audience size of a creator, an input box to select a price range for creation, an input box to select a region for creation, an input box to select a language of the video, and an input box to select a deadline for creation.

In an aspect, in order to employ video creation marketplace 900, a user can register with the service and establish an account. The account can include information about the user including a user's profile, and be associated with a user via a username and password. A user can further identify himself as a video creator or a potential client of a video creator. Accordingly, when the user logs in to the service, the video request component can present the appropriate input menu and the search component can employ the appropriate search software.

As seen in FIG. 900, an example search criteria for a video creation and publication request defines a content category of a video related to health and beauty, makeup with category ID number 21. The search criteria further requires an audience size of greater than 20k subscribers, a medium price range as represented by the three dollar signs, any region, any language, and a due date for creation by the end of the week. Area 912 presents an example search result for the video creation and publication request. As seen in area 912, presented is a list of creators that satisfy or substantially satisfy the search criteria. The creators are identified by a name and icon and further include a brief snippet of information about the respective creators that includes the channel of the creator, the number of views of the channel, and the number of videos created by the creator. Each of the creators can further be associated with a link to example videos for the client to select and view. Further, each of the creators can be presented with information in fields for each of the search criteria. For example, each of the creators can be presented with entries in the field of "subscribers," "price range," "regions," and "languages." The client can then easily compare potential creators and select creators to view an possible contact regarding creating and publishing his desired video.

Figure 10:
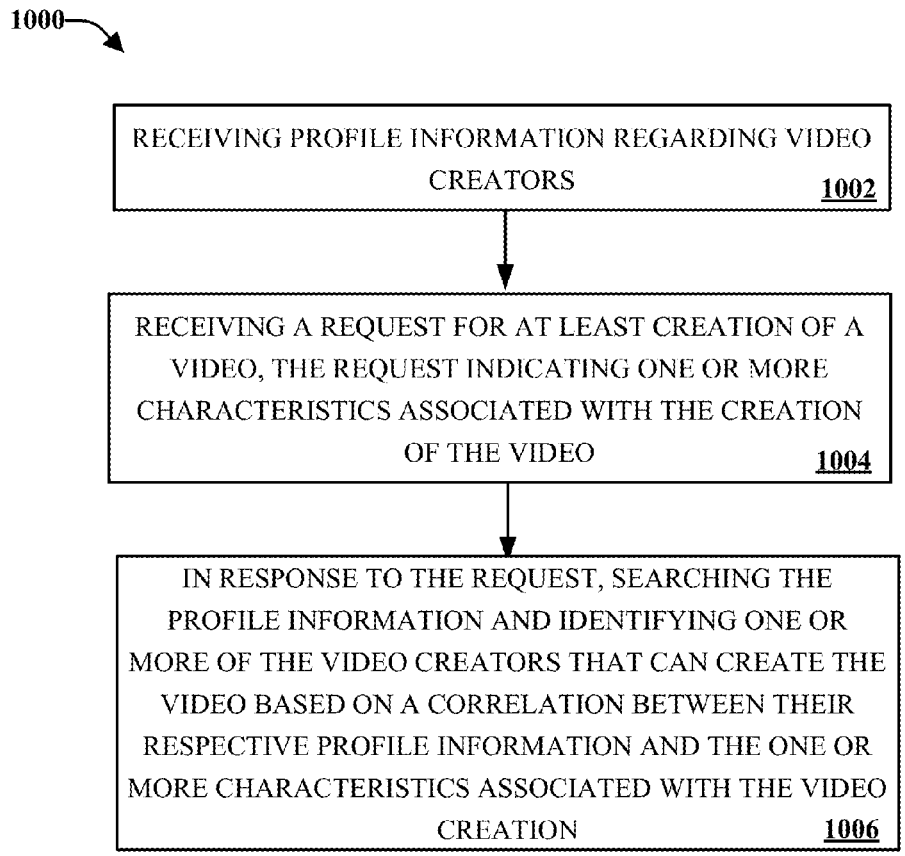
FIG. 10 illustrates an example methodology for finding a video creator by a users in need of a video creations and/or publication in accordance with various aspects and implementations described herein.
Figure 11:
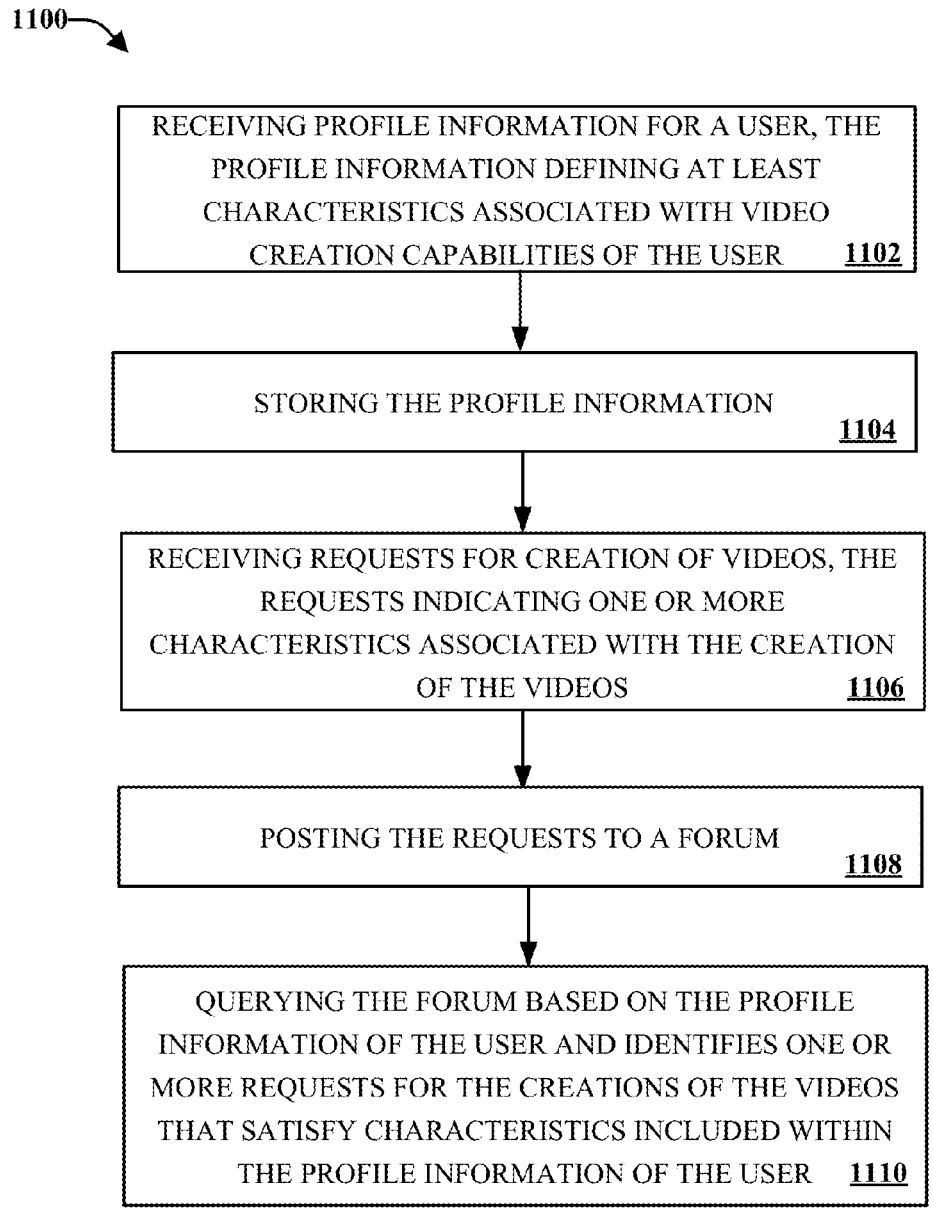
FIG. 11 illustrates an example methodology for finding a video creation and/or publication service request by a creator in accordance with various aspects and implementations described herein.

FIGS. 10-11 illustrate methodologies or flow diagrams in accordance with certain aspects of this disclosure. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 10, presented is a flow diagram of an example application of systems disclosed in this description accordance with an embodiment. In an aspect, exemplary methodology 1000, a video creation marketplace system is stored in a memory and utilizes a processor to execute computer executable instructions to perform functions. At 1002, profile information is received regarding video creators, (e.g. using profile component 110). The profile information can further be stored in a data store, (e.g. using data store 120). At 1004, a request is received for at least creation of a video, (e.g. using video request component 130). The request can indicate one or more characteristics associated with the creation of the video. At 1006, in response to the request, the profile information is searched and one or more of the video creators that can create the video based on a correlation between their respective profile information and the one or more characteristics associated with the video creation, are identified, (e.g. using search component 140).

Referring now to FIG. 11, presented is another flow diagram of an example application of systems disclosed in this description accordance with an embodiment. In an aspect, exemplary methodology 1100, a video creation marketplace system is stored in a memory and utilizes a processor to execute computer executable instructions to perform functions. At 1102, profile information is received for a user, (e.g. using profile component 110). The profile information defines at least characteristics associated with video creation capabilities of the user. At 1104, the profile information can further be stored in a data store, (e.g. using data store 120). At 1006, requests are received for creation of videos, the requests indicating one or more characteristics associated with the creation of the videos, (e.g. using video request component 130). At 1108, the requests are posted to a forum, (e.g. using posting component 510). The at 1108, the forum is queried based on the profile information of the user and one or more requests for the creations of the videos that satisfy characteristics included within the profile information of the user, are identified, (e.g. using search component 140).

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described in this disclosure. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described in this disclosure, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described in this disclosure, and similarly, storage can be effected across a plurality of devices. Accordingly, the invention is not to be limited to any single embodiment, but rather can be construed in breadth, spirit and scope in accordance with the appended claims.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 12:
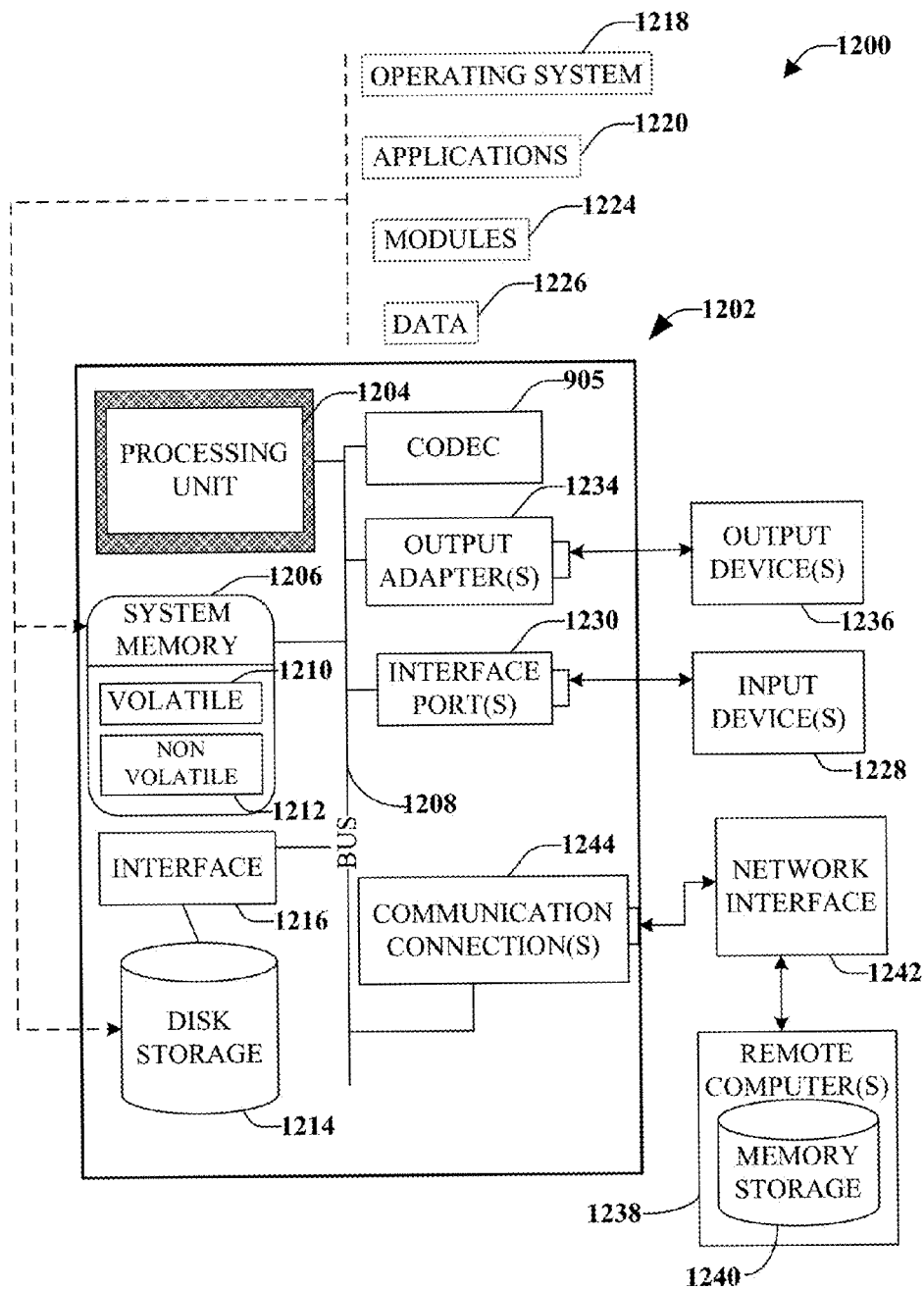
FIG. 12 is a block diagram representing an exemplary non-limiting networked environment in which various embodiments can be implemented in accordance with various aspects and implementations described herein.

With reference to FIG. 12, a suitable environment 1200 for implementing various aspects of the claimed subject matter includes a computer 1202. The computer 1202 includes a processing unit 1204, a system memory 1206, a codec 1205, and a system bus 1208. It is to be appreciated that computer 1202 can be employed to implement one or more of the systems or components shown or described in connection with FIGS. 1-9. In an aspect, processing unit 1204 and system memory 1206 can represent processor 150 and memory 160 respectively. The system bus 1208 couples system components including, but not limited to, the system memory 1206 to the processing unit 1204. The processing unit 1204 can be any of various available processors. Dual microprocessors and other multiprocessor architectures also can be employed as the processing unit 1204.

The system bus 1208 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 13124), and Small Computer Systems Interface (SCSI).

The system memory 1206 includes volatile memory 1210 and non-volatile memory 1212. The basic input/output system (BIOS), containing the basic routines to transfer information between elements within the computer 1202, such as during start-up, is stored in non-volatile memory 1212. In addition, according to present innovations, codec 1205 may include at least one of an encoder or decoder, wherein the at least one of an encoder or decoder may consist of hardware, a combination of hardware and software, or software. Although, codec 1205 is depicted as a separate component, codec 1205 may be contained within non-volatile memory 1212. By way of illustration, and not limitation, non-volatile memory 1212 can include read only memory (ROM), programmable ROM (PROM), electrically programmable ROM (EPROM), electrically erasable programmable ROM (EEPROM), or flash memory. Volatile memory 1210 includes random access memory (RAM), which acts as external cache memory. According to present aspects, the volatile memory may store the write operation retry logic (not shown in FIG. 12) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1202 may also include removable/non-removable, volatile/non-volatile computer storage medium. FIG. 12 illustrates, for example, disk storage 1214. Disk storage 1214 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1214 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1214 to the system bus 1208, a removable or non-removable interface is typically used, such as interface 1216.

It is to be appreciated that FIG. 12 describes software that acts as an intermediary between users and the basic computer resources described in the suitable operating environment 1200. Such software includes an operating system 1218. Operating system 1218, which can be stored on disk storage 1214, acts to control and allocate resources of the computer system 1202. Applications 1220 take advantage of the management of resources by operating system 718 through program modules 1224, and program data 1226, such as the boot/shutdown transaction table and the like, stored either in system memory 1206 or on disk storage 1214. It is to be appreciated that the claimed subject matter can be implemented with various operating systems or combinations of operating systems.

A user enters commands or information into the computer 1202 through input device(s) 1228. Input devices 1228 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1204 through the system bus 1208 via interface port(s) 1230. Interface port(s) 1230 include, for example, a serial port, a parallel port, a game port, and a universal serial bus (USB). Output device(s) 1236 use some of the same type of ports as input device(s) 1228. Thus, for example, a USB port may be used to provide input to computer 1202, and to output information from computer 1202 to an output device 1236. Output adapter 1234 is provided to illustrate that there are some output devices 1236 like monitors, speakers, and printers, among other output devices 1236, which require special adapters. The output adapters 1234 include, by way of illustration and not limitation, video and sound cards that provide a means of connection between the output device 1236 and the system bus 1208. It should be noted that other devices and/or systems of devices provide both input and output capabilities such as remote computer(s) 1238.

Computer 1202 can operate in a networked environment using logical connections to one or more remote computers, such as remote computer(s) 1238. The remote computer(s) 1238 can be a personal computer, a server, a router, a network PC, a workstation, a microprocessor based appliance, a peer device, a smart phone, a tablet, or other network node, and typically includes many of the elements described relative to computer 1202. For purposes of brevity, only a memory storage device 1240 is illustrated with remote computer(s) 1238. Remote computer(s) 1238 is logically connected to computer 1202 through a network interface 1242 and then connected via communication connection(s) 1244. Network interface 1242 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1244 refers to the hardware/software employed to connect the network interface 1242 to the bus 1208. While communication connection 1244 is shown for illustrative clarity inside computer 1202, it can also be external to computer 1202. The hardware/software necessary for connection to the network interface 1242 includes, for exemplary purposes only, internal and external technologies such as, modems including regular telephone grade modems, cable modems and DSL modems, ISDN adapters, and wired and wireless Ethernet cards, hubs, and routers.

Figure 13:
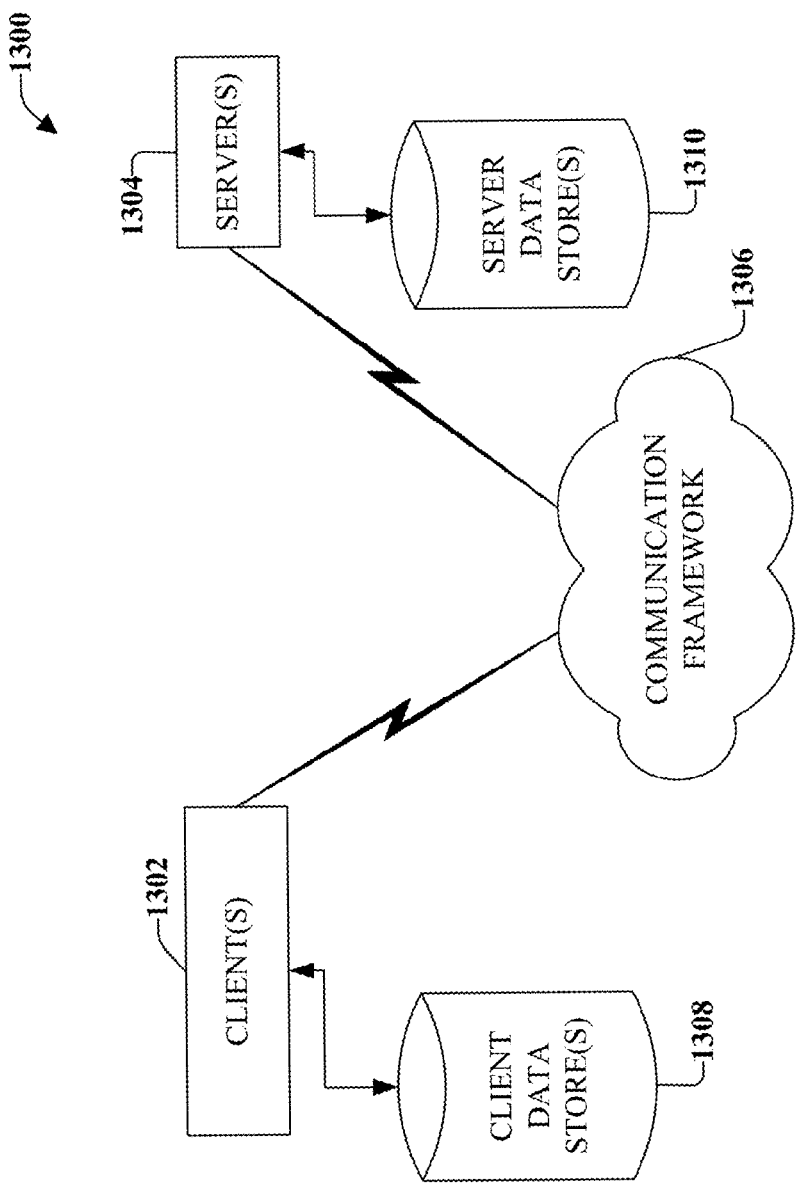
FIG. 13 is a block diagram representing an exemplary non-limiting computing system or operating environment in which various embodiments may be implemented in accordance with various aspects and implementations described herein.

Referring now to FIG. 13, there is illustrated a schematic block diagram of a computing environment 1300 in accordance with this disclosure. The system 1300 includes one or more client(s) 1302 (e.g., laptops, smart phones, PDAs, media players, computers, portable electronic devices, tablets, and the like). System 1300 can for example be employed in connection with implementing one or more of the systems or component described herein show in FIGS. 1-8. The client(s) 1302 can be hardware and/or software (e.g., threads, processes, computing devices). The system 1300 also includes one or more server(s) 1304. The server(s) 1304 can also be hardware or hardware in combination with software (e.g., threads, processes, computing devices). The servers 1304 can house threads to perform transformations by employing aspects of this disclosure, for example. One possible communication between a client 1302 and a server 1304 can be in the form of a data packet transmitted between two or more computer processes wherein the data packet may include video data. The data packet can include metadata, e.g., associated contextual information, for example. The system 1300 includes a communication framework 1306 (e.g., a global communication network such as the Internet, or mobile network(s)) that can be employed to facilitate communications between the client(s) 1302 and the server(s) 1304.

Communications can be facilitated via a wired (including optical fiber) and/or wireless technology. The client(s) 1302 include or are operatively connected to one or more client data store(s) 1308 that can be employed to store information local to the client(s) 1302 (e.g., associated contextual information). Similarly, the server(s) 1304 are operatively include or are operatively connected to one or more server data store(s) 1310 that can be employed to store information local to the servers 1304.

In one embodiment, a client 1302 can transfer an encoded file, in accordance with the disclosed subject matter, to server 1304. Server 1304 can store the file, decode the file, or transmit the file to another client 1302. It is to be appreciated, that a client 1302 can also transfer uncompressed file to a server 1304 and server 1304 can compress the file in accordance with the disclosed subject matter. Likewise, server 1304 can encode video information and transmit the information via communication framework 1306 to one or more clients 1302.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows.

Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system comprising:
    a memory having stored thereon computer executable components; and
    a processor configured to execute the following computer executable components stored in the memory:
        a profile component that receives profile information regarding video creators, wherein the video creators are respectively associated with channels hosted by a streaming media provider via which the respective creators share videos to users of the streaming media provider, and wherein the profile information comprises video content category information identifying categories of video content respectively associated with the channels, and subscriber information identifying numbers of subscribers respectively associated with the channels;

a video request component that receives a request for at least creation of an original video, the request identifying characteristics associated with the creation of the original video, including a video content category for the original video, and a number of subscribers associated with a channel of a video creator; and a search component that, in response to the request, searches the profile information in connection with identifying one or more of the video creators suitable for the creation of the original video based on a correlation between respective profile information of the one or more of the video creators and the characteristics associated with the creation of the original video.

2. The system of claim 1, wherein the request for the creation of the original video is a request for the creation of an original video that that does not include any content provided by an entity making the request.

3. The system of claim 1, wherein the respectively associated with the video creators respectively comprise a user demographic profile that the respective video creators are known to attract.

4. The system of claim 1, wherein the characteristics further include at least one of: a number of actors to be included in the original video, or a description of actors to be included in the original video.

5. The system of claim 1, wherein the correlation between the respective profile information of the one or more of the video creators and the characteristics associated with the creation of the original video is based on respective channels of the one or more content creators being associated with at least the number of subscribers identified in the request.

6. The system of claim 1, wherein the characteristics further include a product or service to be identified in the original video.

7. The system of claim 1, wherein the characteristics further include a setting to be included in the original video.

8. The system of claim 1, wherein the video request component further receives a request to publish the original video on a channel associated with a potential video creator following creation of the original video by the potential video creator, wherein the search component further searches the profile information in connection with identifying one or more of the video creators that can create the original video and publish the original video on their respective channels, based on their respective profile information.

9. The system of claim 1, further comprising:
a review component that receives rating information for a video creator and associates the rating information with the video creator's profile.

10. The system of claim 1, further comprising:
a communication component that facilitates communication between an entity making the request and at least one of the identified one or more of the video creators that can create the original video.

11. The system of claim 1, wherein the profile information further comprising: video characteristic information identifying characteristics of videos content creators are capable of creating, billing information identifying prices for creation of a video and publication of a video, and time information identifying time-frames associated with creation of a video.

12. The system of claim 1, further comprising:
a posting component that posts the request for the creation of the original video to a forum or a profile associated with an entity making the request.

13. The system of claim 12, further comprising:
an auctioning component that receives a bid from a video creator to create the original video in accordance with the posted request and presents the bid to the entity making the request.

14. The system of claim 13, further comprising:
a contract component that facilitates granting the bid and generating a contract between the bidder and the entity making the request for the original video, the contract defining terms for at least one of the creation of the original video or the publishing of the original video.

15. The system of claim 14, further comprising:
a billing component that facilitates billing the entity making the request for the video in accordance with the contract.

16. A system comprising:
a memory having stored thereon computer executable components; and
a processor configured to execute the following computer executable components stored in the memory:
a profile component that receives profile information for a user, the profile information defining at least characteristics associated with video creation capabilities of the user and a number of subscribers to a channel associated with the user;
a data store that stores the profile information;
a video request component that receives a request for creation of an original video, the request indicating one or more characteristics associated with the creation of the original video, including a type of content to be included in the original video and a number of subscribers associated with a potential creator of the video; and
a search component that queries a forum and determines whether the user is suitable for the creation of original video based on correspondence between the one or more characteristics of the request and the profile information for the user.

17. The system of claim 16, further comprising:
a communication component that facilitates communication between the user and an entity making the request in response to a determination that the user is suitable for the creation of the original video.

18. The system of claim 16, further comprising:
an auctioning component that receives a bid associated with the user to create the original video in accordance with the request, and presents the bid to an entity making the request.

19. The system of claim 18, further comprising:
a contract component that receives authorization to grant the bid, and in response to the authorization, generates a contract between the user and the entity making the request for the original video, the contract defining terms for the creation of the original video.

20. The system of claim 19, further comprising:
a billing component that facilitates billing the entity making the request for the original video in accordance with the contract.

21. The system of claim 16, wherein the one or more characteristics further include, a number of actors to be included in the original video, or a description of actors to be included in the original video.

22. The system of claim 16, wherein the one or more characteristics further include a product or service to be identified in the original video.

23. The system of claim 16, wherein the one or more characteristics further include a setting to be included in the original video.

24. The system of claim 16, wherein the one or more characteristics further include a time frame for the creation of the original video.

25. The system of claim 16, wherein the one or more characteristics further include a desired duration for the original video.

26. The system of claim 16, further comprising:
a posting component that posts the request for the creation of the original video to the forum.

27. A method comprising:
using at least one microprocessor to execute computer executable instructions stored on at least one non-transitory computer readable medium to perform the following acts:
receiving profile information regarding video creators, wherein the video creators are respectively associated with channels hosted by a streaming media provider via which the respective creators share videos to users of the streaming media provider, and wherein the profile information comprises video content category information identifying categories of video content respectively associated with the channels, and subscriber information identifying numbers of subscribers respectively associated with the channels;
receiving a request for at least creation of an original video, the request identifying characteristics associated with the creation of the original video, including a video content category for the original video, and a number of subscribers associated with a channel of a video creator; and
in response to the request, searching the profile information and identifying one or more of the video creators suitable for the creation of the original video based on a correlation between respective profile information of the one or more of the video creators and the characteristics associated with the creation of the original video.

28. The method of claim 27, wherein the request for the creation of the original video is a request for the creation of an original video that that does not include any content provided by an entity making the request.

29. The method of claim 27, wherein the characteristics further include a product to be identified in the original video.

30. The method of claim 27, further comprising:
receiving a request to publish the original video on a channel associated with a potential video creator following the creation of the original video by the potential video creator; and
searching the profile information and identifying one or more of the video creators that can create the video and publish the video on their respective channels, based on their respective profile information.

\* \* \* \* \*